(12) United States Patent
Kimura

(10) Patent No.: US 11,054,040 B2
(45) Date of Patent: Jul. 6, 2021

(54) ELECTROMAGNETIC VALVE

(71) Applicant: MIKUNI CORPORATION, Tokyo (JP)

(72) Inventor: Takahiko Kimura, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 16/507,212

(22) Filed: Jul. 10, 2019

(65) Prior Publication Data

US 2020/0025294 A1 Jan. 23, 2020

(30) Foreign Application Priority Data

Jul. 18, 2018 (JP) .............................. JP2018-135282

(51) Int. Cl.
*F16K 1/20* (2006.01)
*F16K 27/02* (2006.01)
*F16K 31/06* (2006.01)

(52) U.S. Cl.
CPC ........ *F16K 1/2007* (2013.01); *F16K 27/0227* (2013.01); *F16K 31/0655* (2013.01)

(58) Field of Classification Search
CPC ............... F16K 1/2007; F16K 27/0227; F16K 31/0658; F16K 31/0655; F16K 31/08
USPC ........................................ 251/129.21, 129.16
See application file for complete search history.

(56) References Cited

U.S. PATENT DOCUMENTS

| | | | | |
|---|---|---|---|---|
| 2,860,850 A | * | 11/1958 | Rhodes | F16K 31/0651 251/129.21 |
| 2,931,619 A | * | 4/1960 | Andersson | F16K 31/0651 251/129.21 |
| 3,752,602 A | * | 8/1973 | Hansen | F04C 14/06 417/310 |
| 3,961,644 A | * | 6/1976 | Eckert | F02M 69/54 137/625.65 |
| 4,196,751 A | * | 4/1980 | Fischer | F16K 31/0606 137/625.65 |
| 4,610,428 A | * | 9/1986 | Fox | H01F 7/1638 251/129.16 |
| 4,969,629 A | * | 11/1990 | Athanassiu | F16K 7/12 251/129.17 |
| 5,158,263 A | * | 10/1992 | Shimizu | F16K 31/0651 251/129.17 |
| 5,628,491 A | * | 5/1997 | Krone | A01J 5/14 251/129.21 |
| 5,758,865 A | * | 6/1998 | Casey | F16K 31/06 251/129.21 |

(Continued)

FOREIGN PATENT DOCUMENTS

JP 5772343 B2 9/2015

*Primary Examiner* — Umashankar Venkatesan
(74) *Attorney, Agent, or Firm* — Rossi, Kimms & McDowell LLP

(57) ABSTRACT

To provide an electromagnetic valve with less parts count of components for opening-closing operation. An electromagnetic valve 2 includes a solenoid unit 4 including a cylinder-shaped coil 10 with a flow path formed at an inner circumferential side of the coil 10, a valve body portion 20, a plate spring portion 22 urging the valve body portion 20 toward a valve seat 16 formed on an end face 14 on a downstream side in a flow direction of the flow path 12 out of end faces of the solenoid unit 4, and a casing 8 accommodating the solenoid unit 4, the valve body portion 20 and the plate spring portion 22.

13 Claims, 16 Drawing Sheets

(56) References Cited

U.S. PATENT DOCUMENTS

| | | | | |
|---|---|---|---|---|
| 6,149,126 A | * | 11/2000 | Krimmer | F02M 25/0836 |
| | | | | 123/516 |
| 2004/0065858 A1 | * | 4/2004 | Schroeder | F16K 31/0672 |
| | | | | 251/129.15 |

* cited by examiner

ELECTROMAGNETIC VALVE

TECHNICAL FIELD

This disclosure relates to an electromagnetic valve.

BACKGROUND

As a traditional electromagnetic valve, Patent Document 1 discloses an electromagnetic valve in which fluid flows through an inner circumference side of a coil. In the electromagnetic valve, a valve seat is formed on an end face of the coil on the downstream side in the flow direction of the fluid. Here, a valve body is configured to be rotated about a spindle arranged adjacent to a part, in the circumferential direction, of the valve seat and is urged toward the valve seat by a spring.

According to the above configuration, when the valve body is moved in an opening direction, spatial distance between the valve body and the coil is short at a region and long at another region. The region having the long spatial distance enables flow path area to be enlarged expeditiously when the valve is opened. Further, when power is supplied to the coil in the state that the valve is opened, an electromagnetic force generated accordingly by the coil is easily exerted on the valve body at the region having the short spatial distance. Thus, the electromagnetic force acts to pull the valve body strongly.

Accordingly, compared to a configuration to move a valve body linearly in a normal direction of a valve seat, it is possible to strongly pull the valve body with the electromagnetic force generated by the coil.

CITATION LIST

Patent Literature

Patent Document 1: JP5772343

SUMMARY

As described above, the electromagnetic valve disclosed in Patent Document 1 is required to include the spring and the spindle that rotatably supports the valve body. Accordingly, parts count of components for opening-closing operation increases, causing a problem that cost tends to increase.

In this regard, it is an object of at least one of embodiments of the present disclosure to provide an electromagnetic valve with less parts count of components for opening-closing operation.

(1) An electromagnetic valve according to at least one of embodiments of the present invention includes a solenoid unit including a cylinder-shaped coil with a flow path formed at an inner circumferential side of the coil; a valve body portion; a plate spring portion urging the valve body portion toward a valve seat formed on an end face on a downstream side in a flow direction of the flow path out of end faces of the solenoid unit; and a casing accommodating the solenoid unit, the valve body portion, and the plate spring portion.

(2) In some embodiments, in the electromagnetic valve described above as (1), the casing may include a plate spring fixing portion fixing the plate spring portion, and the plate spring fixing portion may be arranged outside the coil in a radial direction of the coil.

(3) In some embodiments, in the electromagnetic valve described above as (2), the plate spring fixing portion may include a tilted face tilted so that a distance in an axial direction of the coil to the valve seat of the solenoid unit increases toward the outside in the radial direction of the coil, and the plate spring portion may be fixed to the plate spring fixing portion as being deformed along the tilted face.

(4) In some embodiments, in the electromagnetic valve described above as any one of (1) to (3), the valve body portion and the plate spring portion may be made of materials different from each other.

(5) In some embodiments, in the electromagnetic valve described above as (4), magnetic permeability of the valve body portion may be larger than that of the plate spring portion.

(6) In some embodiments, in the electromagnetic valve described above as (4) or (5), a thickness of the valve body portion may be larger than that of the plate spring portion.

(7) In some embodiments, in the electromagnetic valve described above as any one of (4) to (6), the plate spring portion may include a ring-shaped portion, an inner diameter of the ring-shaped portion may be larger than an outer diameter of the valve seat, the ring-shaped portion may hold the valve body portion on an opposite side to the coil, and the valve seat may be arranged capable of contacting to the valve body portion at the inner circumferential side of the ring-shaped portion.

(8) In some embodiments, in the electromagnetic valve described above as any one of (1) to (7), the flow path may be a flow path through which coolant for an engine flows, the solenoid unit may include a cylinder-shaped inner yoke arranged at the inner circumferential side of the coil, the valve seat may be formed on an end face of the inner yoke at the downstream side of the flow direction, and the inner yoke may be formed as satisfying S<Q, while S denotes area of the valve seat and Q denotes sectional area of the inner yoke at a center position of the coil in the flow direction.

(9) In some embodiments, in the electromagnetic valve described above as any one of (1) to (8), the casing may include at least one regulating portion regulating a deformation amount of the valve body portion at a position opposite to the coil with respect to the valve body portion.

(10) In some embodiments, in the electromagnetic valve described above as (9), the at least one regulating portion may include a plurality of regulating portions arranged at intervals in the circumferential direction of the coil, each of the regulating portions may be protruded toward the valve body portion, a top face of each regulating portion may be tilted so that a distance d3 in the axial direction of the coil to a base end of the plate spring portion increases with increase of a distance d2 in the radial direction of the coil to the base end, and the top faces of the respective regulating portions may be arranged on the same plane.

(11) In some embodiments, in the electromagnetic valve described above as any one of (1) to (10), the plate spring portion may include a ring-shaped portion and an arm portion extending from the ring-shaped portion, the casing may include an arm accommodating portion accommodating the arm portion, and a cylinder-shaped terminal accommodating portion accommodating a terminal of the coil, and an angle θ, viewing in the axial direction of the coil, formed between a line segment L1 that connects an axial center O of the coil and an outer end P1 and a line segment L2 that connects the axial center O and a sectional center P2 may be 90 degrees or smaller, while P1 denotes the outer end of the arm accommodating portion in the radial direction of the coil and P2 denotes the sectional center of the terminal accommodating portion at a leading end of the terminal accommodating portion.

At least one of the embodiments of the present disclosure provides an electromagnetic valve having less parts count of components for opening-closing operation.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

For example, descriptions on a relative or absolute arrangement such as "in a direction", "along a direction", "in parallel", "orthogonal to", "center", "concentric", and "coaxial" shall represent not only arrangements as strictly described thereby, but also arrangements within tolerance or having relative deformation with angles and distances to the extent to obtain the same functions.

For example, descriptions representing states of being equal such as "identical", "same", and "uniform" shall represent not only states of being strictly equal, but also states having allowable errors or differences to the extent to obtain the same functions.

For example, descriptions on shapes such as rectangular shapes and cylindrical shapes shall represent not only geometrically strict shapes, but also shapes including concave-convex portions, chamfered portions and the like to the extent to obtain the same functions.

Further, descriptions such as "to comprise", "to contain", "to obtain", "to include", or "to have" a structural element shall not be interpreted to exclude existence of another structural element.

Figure 1:
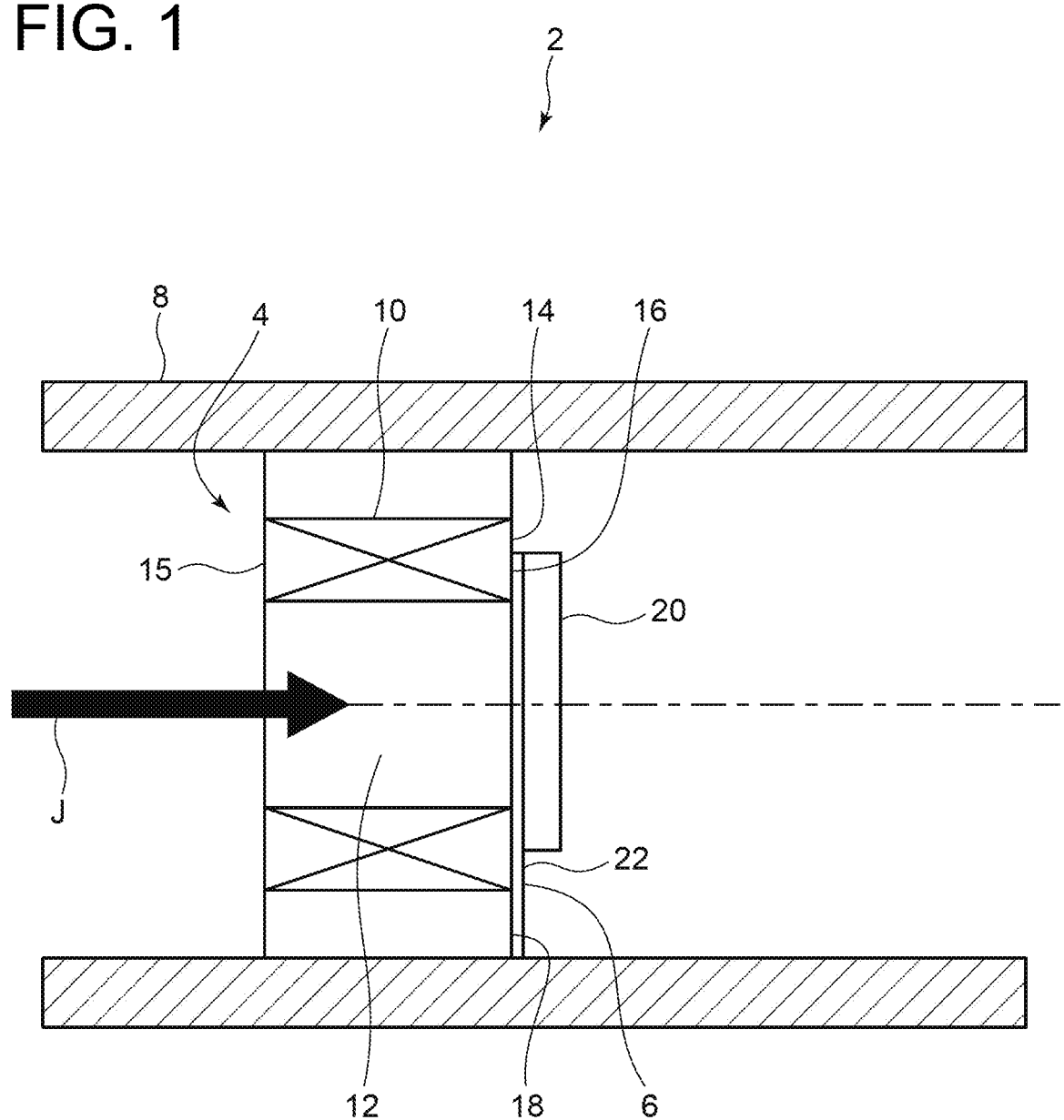
FIG. 1 is a sectional view schematically illustrating an outline configuration of an electromagnetic valve 2 of an embodiment in a closed state.
Figure 2:
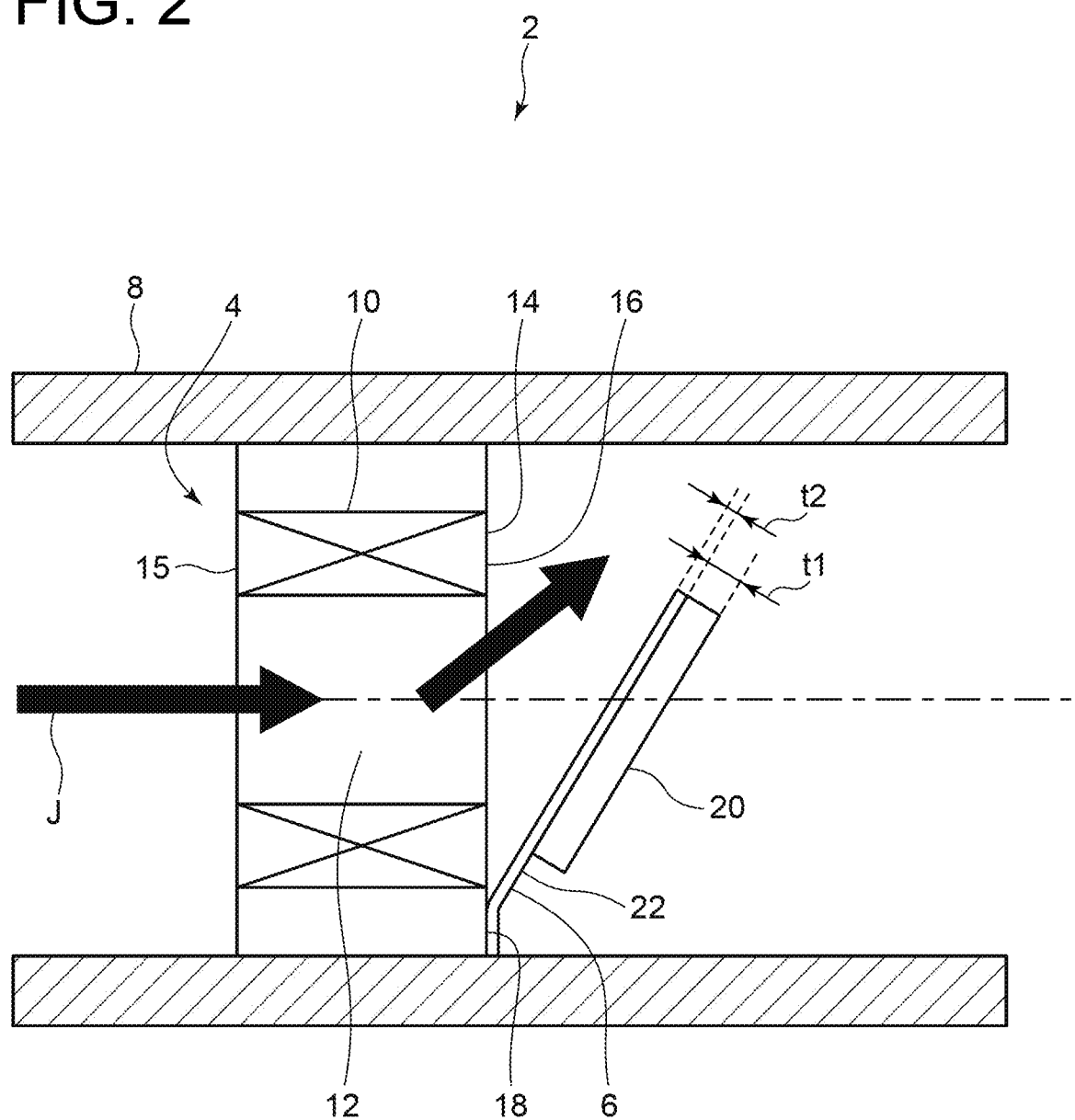
FIG. 2 is a sectional view schematically illustrating an outline configuration of the electromagnetic valve 2 of the embodiment in an open state.

FIG. 1 is a sectional view schematically illustrating an outline configuration of an electromagnetic valve 2 of an embodiment in a closed state. FIG. 2 illustrates an open state of the electromagnetic valve 2 illustrated in FIG. 1. Here, not limited to specific use applications, the electromagnetic valve 2 may be used, for example, for opening-closing of a flow path through which coolant for an engine flows.

In some embodiments, for example as illustrated in FIGS. 1 and 2, the electromagnetic valve 2 includes a solenoid unit 4, a valve body portion 20, a plate spring portion 22, and a casing 8.

The solenoid unit 4 includes a cylinder-shaped coil 10. A flow path 12 is formed at the inner circumferential side of the coil 10. Out of end faces 14, 15 of the solenoid unit 4, a valve seat 16 is formed on the end face 14 on the downstream side in a flow direction J of the flow path 12. Hereinafter, "the downstream side in the flow direction J" is simply denoted by "the downstream side" and "the upstream side in the flow direction J" is simply denoted by "the upstream side".

The plate spring portion 22 is configured to urge the valve body portion 20 toward the valve seat 16. That is, the valve body portion 20 and the plate spring portion 22 configure a reed unit 6. The valve body portion 20, made of a magnetic material, is stuck to the valve seat 16 with an electromagnetic force generated when current is applied to the coil 10. The electromagnetic valve 2 is in a closed state when the valve body portion 20 is pressure-contacted to the valve seat 16 to close the flow path 12 and in an open state when the valve body portion 20 is separated from the valve seat 16 to open the flow path 12.

The casing 8 accommodates the solenoid unit 4, the valve body portion 20, and the plate spring portion 22.

According to the above configuration, the electromagnetic valve 2 is capable of being opened and closed with elastic deformation of the plate spring portion 22. Accordingly, compared to the abovementioned traditional configuration disclosed in Patent Document 1, since a spindle to rotatably support a valve body is not required, parts count of components for opening-closing operation of the electromagnetic valve 2 can be reduced, resulting in cost reduction of the electromagnetic valve 2.

Further, with the abovementioned traditional configuration disclosed in Patent Document 1, since a bearing to receive the spindle rotatably supporting the valve body is required to be arranged, there is a fear that sticking and the like between the spindle and the bearing occur due to variation of dimensional accuracy of the spindle and the bearing, causing possibility that opening-closing operation of the electromagnetic valve cannot be performed reliably.

In contrast, in the electromagnetic valve 2, since the opening-closing operation of the electromagnetic valve 2 is performed utilizing elastic deformation of the plate spring portion 22, the problem of sticking between the spindle and the bearing in Patent Document 1 does not occur, so that reliability of the opening-closing operation can be enhanced.

In some embodiments, for example in the configuration illustrated in FIGS. 1 and 2, the valve body portion 20 and the plate spring portion 22 are made of materials different from each other.

According to the above configuration, a spring constant of the plate spring portion 22 can be adjusted by a thickness, a length, a width, a material, and the like of the plate spring portion 22 and a pulling force toward the coil 10 exerted on the valve body portion 20 when current is applied to the coil 10 can be adjusted by a thickness, a diameter, a material, and the like of the valve body portion 20. Accordingly, appropriate switching of the electromagnetic valve 2 between the open state and the closed state can be easily performed.

In some embodiments, for example in the configuration illustrated in FIGS. 1 and 2, magnetic permeability of the valve body portion 20 is larger than that of the plate spring portion 22.

According to the above configuration, a large pulling force toward the coil 10 can be exerted on the valve body portion 20 of the reed unit 6 when current is applied to the coil 10, while ensuring design flexibility for material selection of the plate spring portion 22 to obtain an appropriate spring constant. Accordingly, appropriate switching of the electromagnetic valve 2 between the open state and the closed state can be easily performed. Here, materials of the valve body portion 20 and the plate spring portion 22 are not specifically limited. For example, the valve body portion 20 may be made of iron and the plate spring portion 22 may be made of stainless steel.

In some embodiments, for example as illustrated in FIG. 2, the casing 8 includes a plate spring fixing portion 18 to fix the plate spring portion 22. The plate spring fixing portion 18 is arranged outside the coil 10 in the radial direction of the coil 10. In the illustrated embodiment, the valve body portion 20 is arranged at one end of the plate spring portion 22. The other end of the plate spring portion 22 is fixed to the plate spring fixing portion 18. Hereinafter, "the radial direction of the coil" is simply denoted by "the radial direction".

Figure 3:
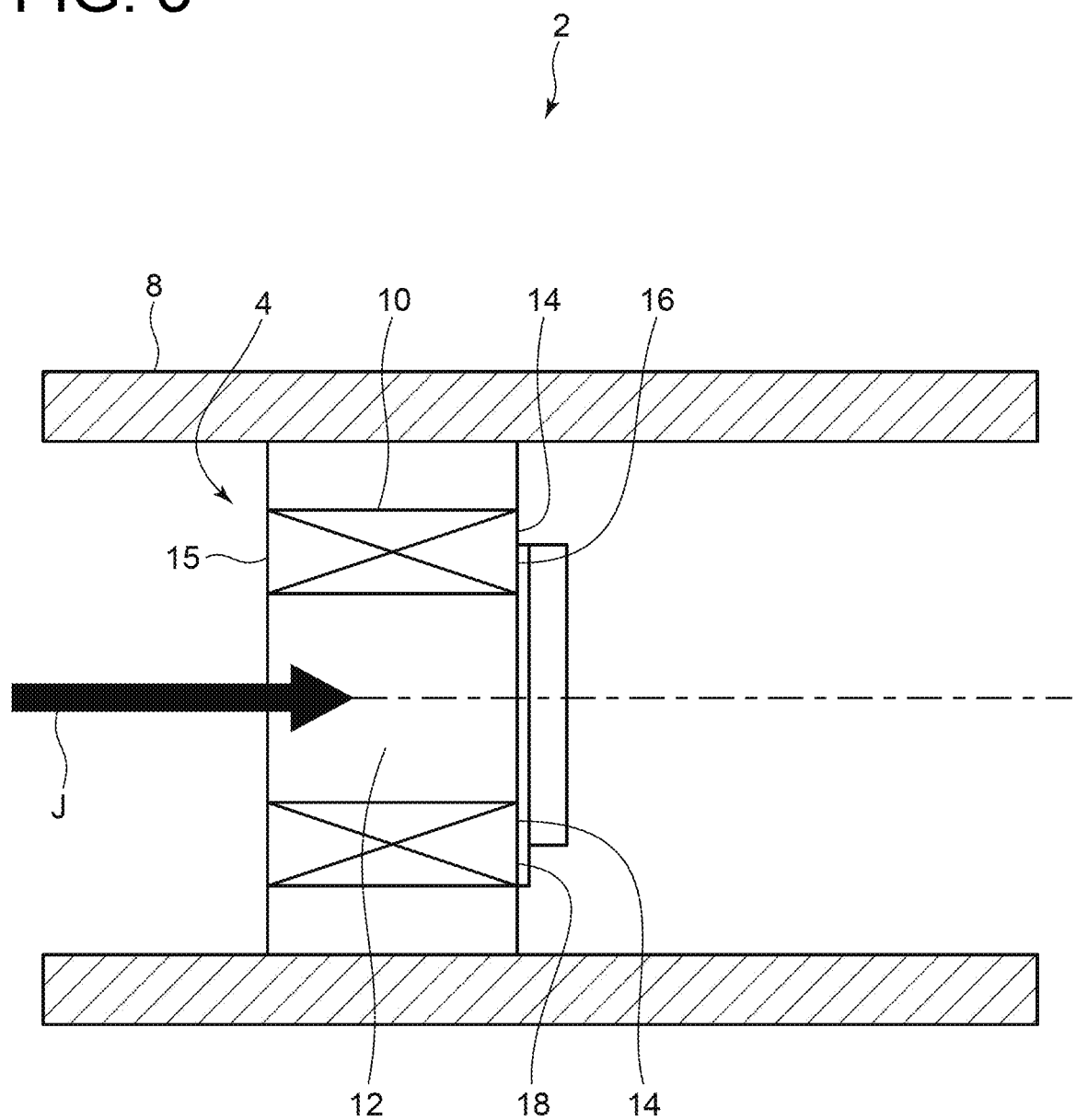
FIG. 3 is a sectional view schematically illustrating an outline configuration of an electromagnetic valve 2 of an embodiment in a state that a plate spring fixing portion 18 is arranged at an end face 14 of a coil 10.

According to the above configuration, compared to a case that the plate spring fixing portion 18 is arranged on the end face 14 of the coil 10 (see FIG. 3), switching between the open-state and the closed state can be appropriately performed with the length of the plate spring portion 22 ensured and the spring constant thereof reduced.

In some embodiments, for example as illustrated in FIG. 2, a thickness t1 of the valve body portion 20 is larger than a thickness t2 of the plate spring portion 22.

According to the above configuration, a large pulling force toward the coil 10 can be exerted on the valve body portion 20 of the reed unit 6 when current is applied to the coil 10 by relatively enlarging the thickness t1 of the valve body portion 20, while obtaining an appropriate spring constant of the plate spring portion 22 by relatively lessening the thickness t2 of the plate spring portion 22. Accordingly, appropriate switching of the electromagnetic valve 2 between the open state and the closed state can be easily performed.

A generally-designed reed valve is used for controlling air flow. However, since a large pulling force toward the coil 10 can be exerted on the valve body portion 20 as described above, the electromagnetic valve 2 equipped with the reed unit 6 can be appropriately used for controlling flow of liquid such as coolant for an engine.

Next, description will be provided on a specific configuration example of the electromagnetic valve 2.

Figure 4:
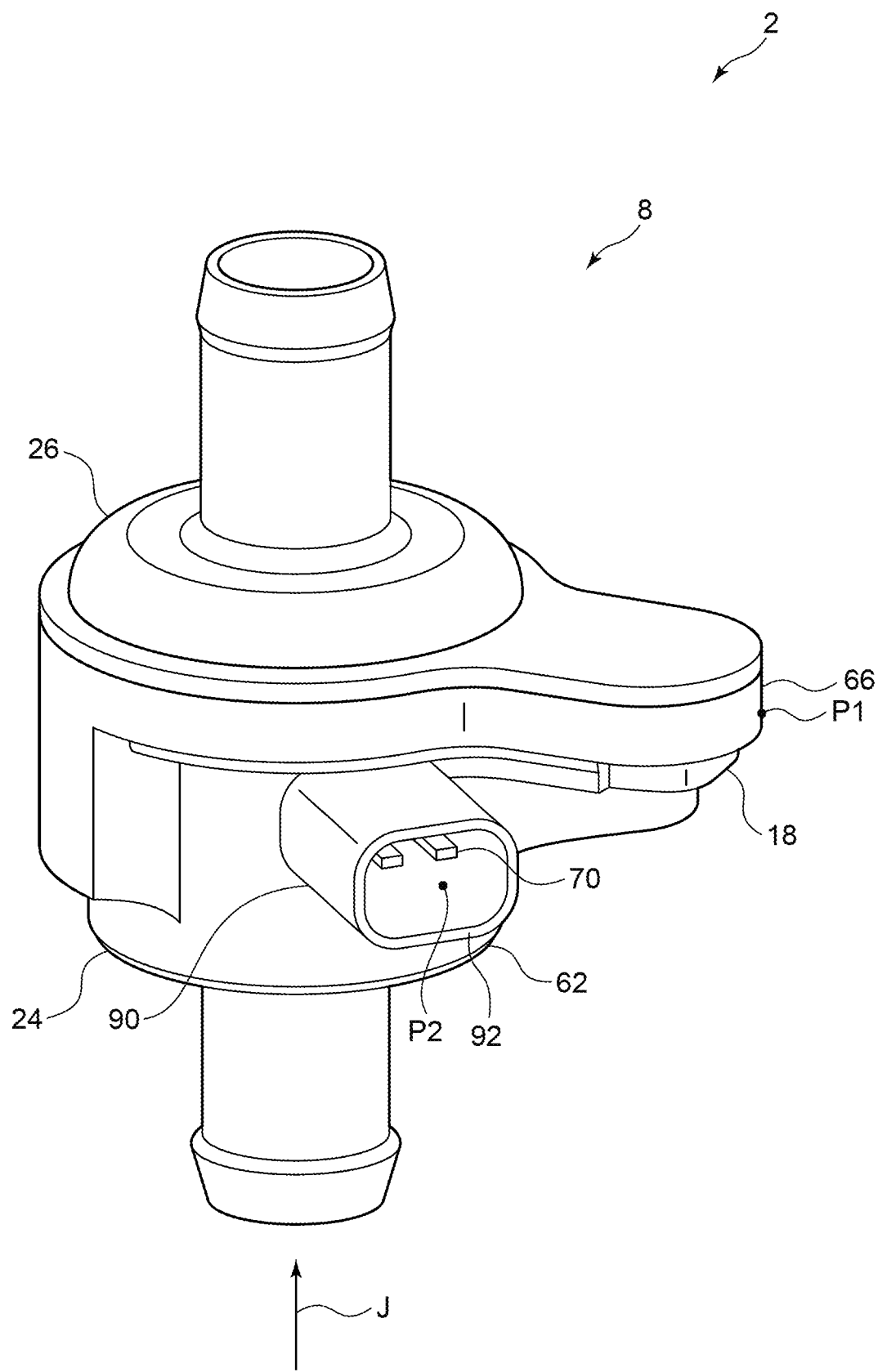
FIG. 4 is a perspective view illustrating external appearance of an electromagnetic valve 2 of an embodiment.
Figure 5:
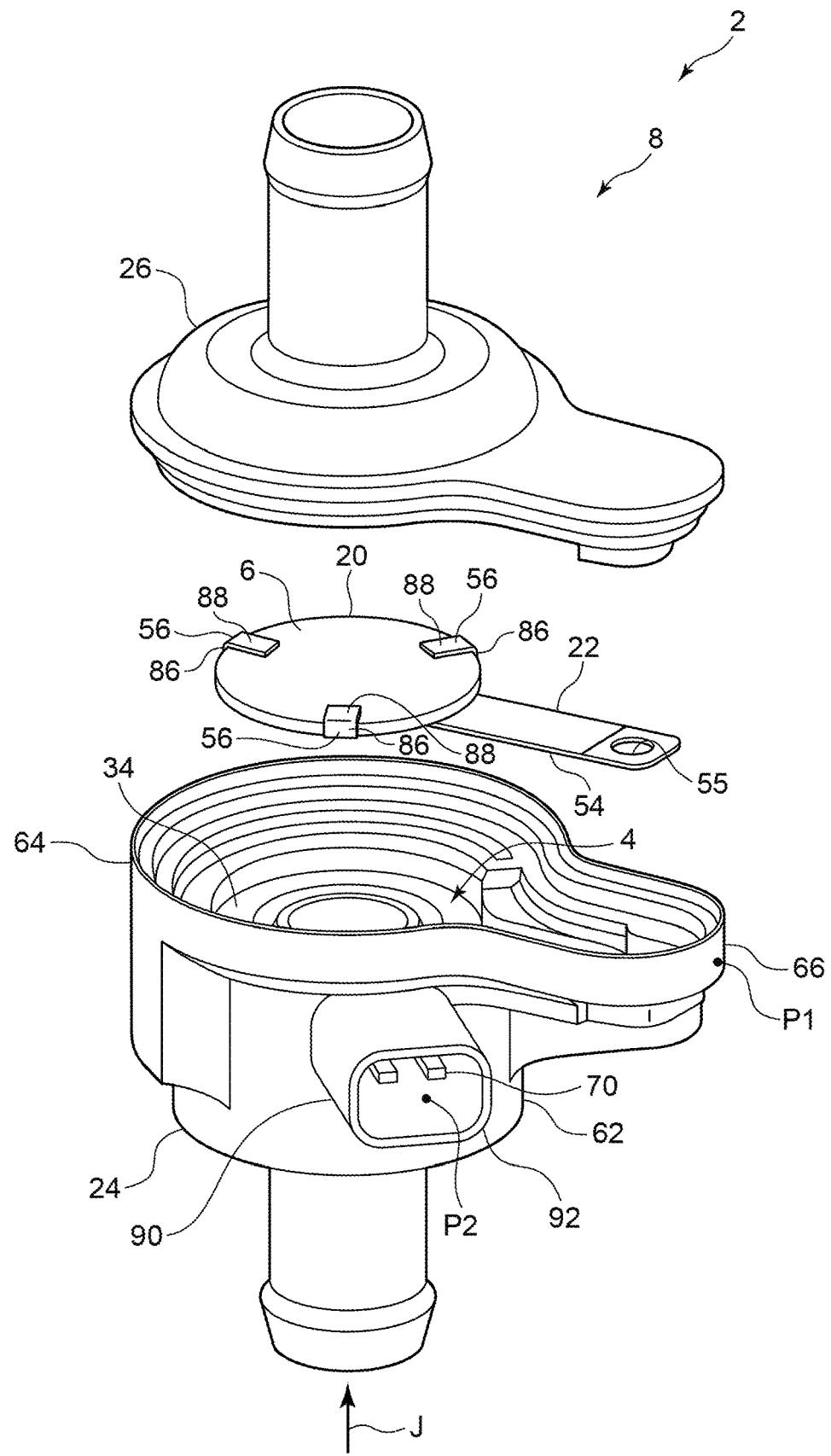
FIG. 5 is an exploded view of the electromagnetic valve 2 of FIG. 4.
Figure 6:
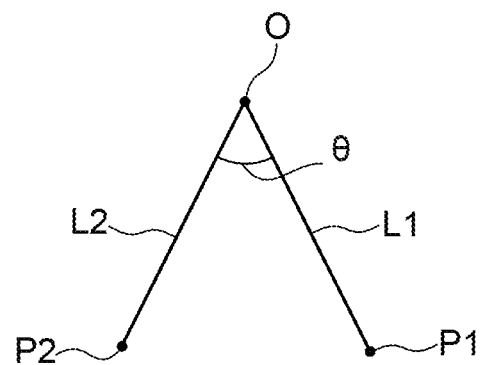
FIG. 6 is a diagram indicating an angle θ, viewing in an axial direction of a coil 10, formed between a line segment L1 that connects an axial center O of the coil 10 and an outer circumferential end P1 and a line segment L2 that connects the axial center O and a sectional center P2.
Figure 7:
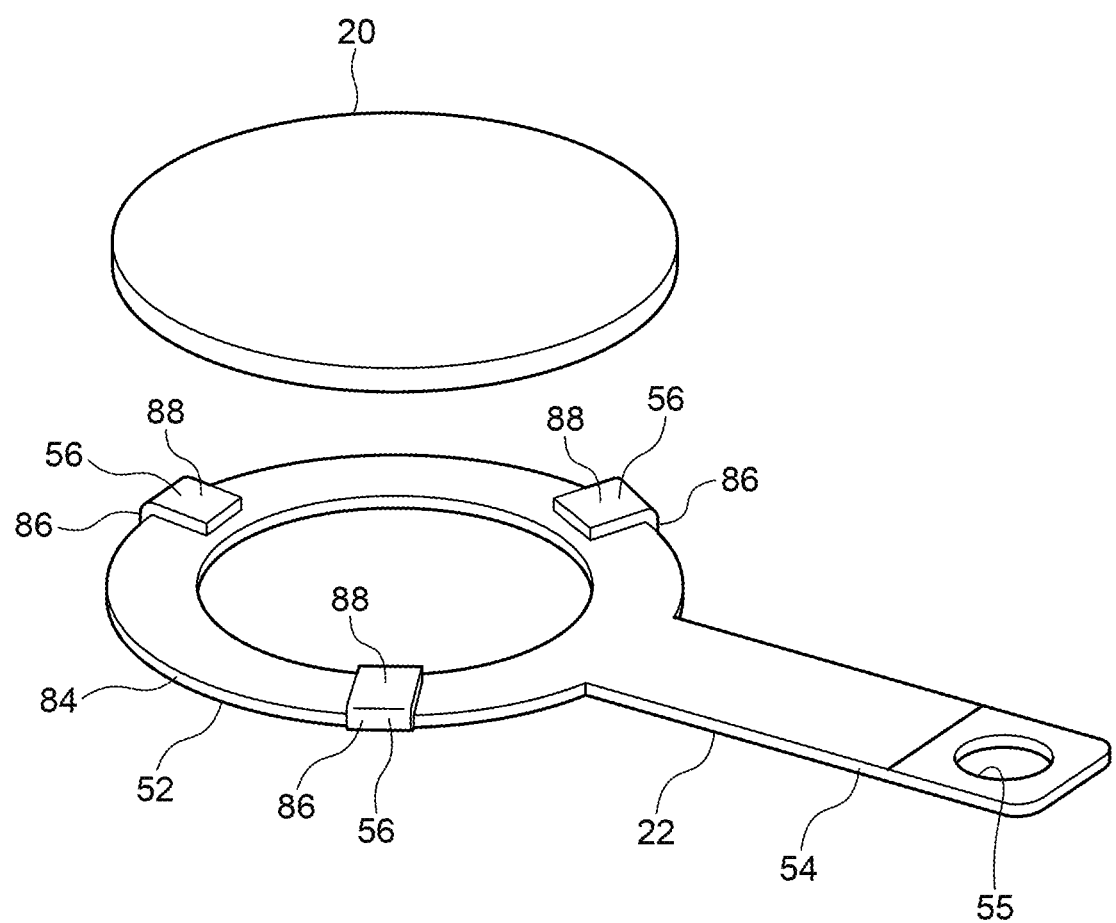
FIG. 7 is an exploded view of a reed unit 6.
Figure 8:
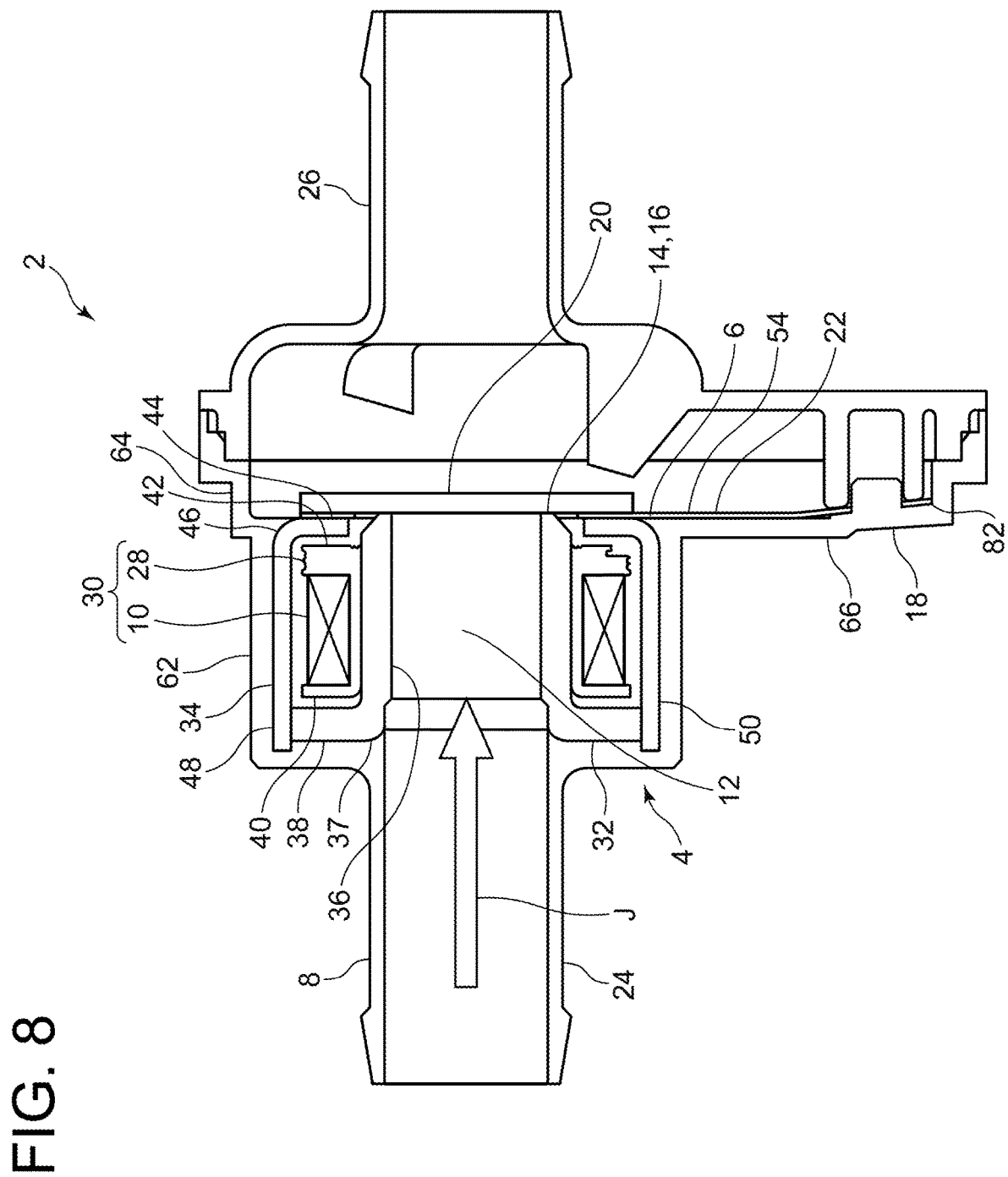
FIG. 8 is a sectional view of the electromagnetic valve 2 of FIG. 4 illustrating a closed state of the electromagnetic valve 2.
Figure 9:
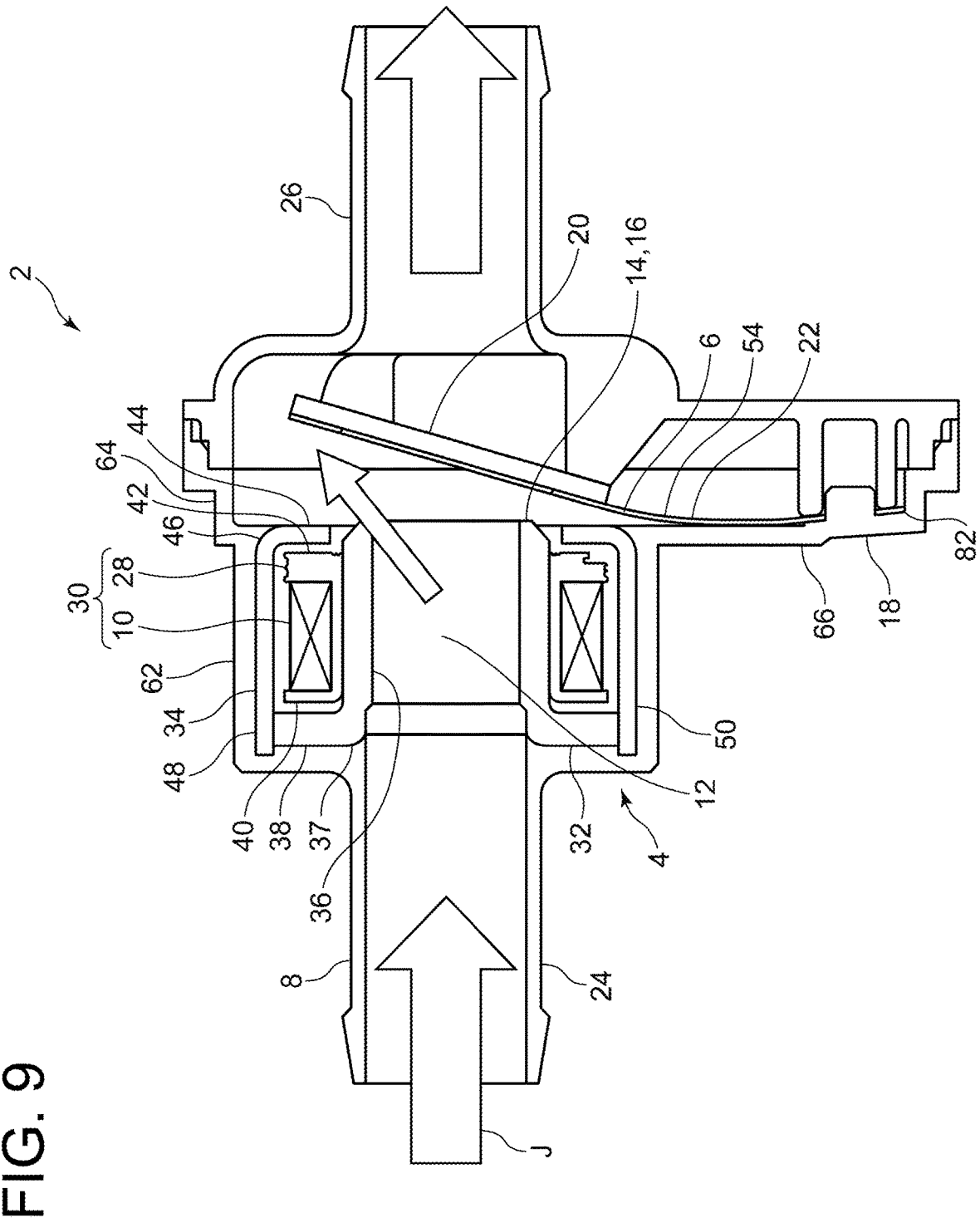
FIG. 9 is a sectional view of the electromagnetic valve 2 of FIG. 4 illustrating an open state of the electromagnetic valve 2.
Figure 10:
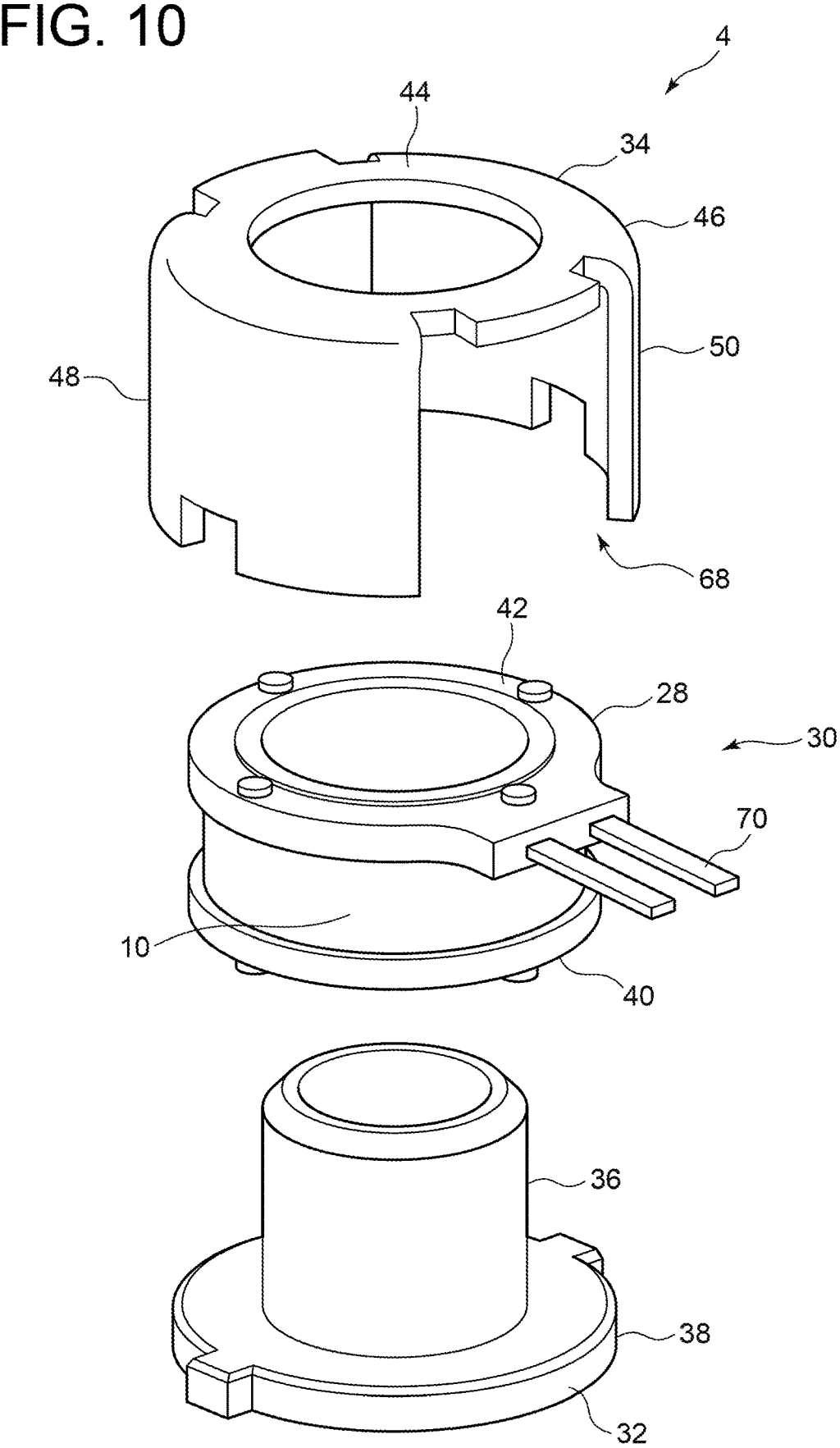
FIG. 10 is an exploded view of a solenoid unit 4 illustrated in FIGS. 8 and 9.

FIG. 4 is a perspective view illustrating external appearance of the electromagnetic valve 2 of an embodiment. FIG. 5 is an exploded view of the electromagnetic valve 2 of FIG. 4. FIG. 6 is a diagram indicating an angle θ, viewing in an axial direction of the coil 10, formed between a line segment L1 that connects an axial center O of the coil 10 and an outer circumferential end P1 and a line segment L2 that connects the axial center O and a sectional center P2. FIG. 7 is an exploded view of the reed unit 6 illustrated in FIG. 5. FIG. 8 is a sectional view of the electromagnetic valve 2 of FIG. 4 illustrating a closed state of the electromagnetic valve 2. FIG. 9 is a sectional view of the electromagnetic valve 2 of FIG. 4 illustrating an open state of the electromagnetic valve 2. FIG. 10 is an exploded view of the solenoid unit 4 illustrated in FIGS. 8 and 9. In the following description on the specific configuration example of the electromagnetic valve 2, the same reference is given to the same structural element as that described with reference to FIGS. 1 and 2 and description thereof will not be repeated.

In some embodiments, for example as illustrated in FIGS. 4 and 5, the casing 8 includes a cylinder-shaped housing 24 and a cover 26 attached to the housing 24.

For example as illustrated in at least one of FIGS. 5 and 7, the plate spring portion 22 of the reed unit 6 includes a ring-shaped portion 52 and an arm portion 54 extending from the ring-shaped portion 52 in one direction. A through-hole 55 penetrating in the axial direction of the coil 10 is formed at the arm portion 54. The ring-shaped portion 52 includes a plurality of clamp portions 56 arranged at intervals in the circumferential direction. The valve body portion 20 having a disc shape is held by the clamp portions 56. Here, the ring-shaped portion 52 includes three clamp portions 56 arranged as being spaced by 120 degrees from one another in the circumferential direction. Each clamp portion 56 includes an axially extending portion 86 extending along the thickness direction of the ring-shaped portion 52 from an outer edge 84 of the ring-shaped portion 52 and a radially extending portion 88 extending inward in the radial direction from a leading end of the axially extending portion 86. The ring-shaped portion 52 holds the valve body portion 20 with each of the clamp portions 56 swaged. In the following, "the axial direction of the coil 10" is simply denoted by "the axial direction".

For example as illustrated in FIGS. 5 and 8, the housing 24 includes a solenoid unit accommodating portion 62 that accommodates the solenoid unit 4, a valve body accommodating portion 64 that accommodates the valve body portion 20 as being adjacent to the solenoid accommodating portion 62 at the downstream side thereof, and an arm accommodating portion 66 that accommodates the arm portion 54 as being protruded outward in the radial direction from the valve body accommodating portion 64. The cover 26 is fitted to the valve body accommodating portion 64 and the arm accommodating portion 66.

For example as illustrated in at least one of FIGS. 8 to 10, the solenoid unit 4 includes a coil unit 30 that includes a cylinder-shaped bobbin 28 and the coil 10 wound to the bobbin 28, a cylinder-shaped inner yoke 32 arranged at the inner circumferential side of the coil 10 as being inserted through the bobbin 28, and an outer yoke 34 arranged at the outer circumferential side of the coil 10. The inner yoke 32 and the outer yoke 34 form a magnetic path when current is applied to the coil 10.

The inner yoke 32 includes a cylindrical portion 36 located at the inner circumferential side of the coil 10, and a ring-shaped protruded portion 38 protruded outward in the radial direction from an upstream end 37 of the cylindrical portion 36. The valve seat 16 of the solenoid unit 4 is formed on the end face 14 of the inner yoke 32 at the downstream side thereof (i.e., the end face 14 of the cylindrical portion 36 at the downstream side thereof). The ring-shaped protruded portion 38 is arranged as being faced to an end face 40 of the coil unit 30 at the upstream side thereof. The outer yoke 34 includes a ring-shaped portion 44 arranged as being faced to an end face 42 of the coil unit 30 at the downstream side thereof, and a pair of side face portions 48, 50 located at the outer circumferential side of the coil 10 as extending to the upstream side from an outer edge 46 of the ring-shaped portion 44. As illustrated in FIG. 10, terminals 70 of the coil 10 are exposed through an opening 68 formed between the side face portion 48 and the side face portion 50 in the circumferential direction of the coil 10.

As illustrated in FIGS. 4 and 5, the housing 24 of the casing 8 includes a cylinder-shaped terminal accommodating portion 90 that accommodates terminals 70 of the coil 10. The terminal accommodating portion 90 is arranged as being protruded outward in the radial direction from the solenoid unit accommodating portion 62. Here, when P1 denotes an outer end of the arm accommodating portion 66 in the radial direction and P2 denotes the sectional center of the terminal accommodating portion 90 at a leading end 92 of the terminal accommodating portion 90, an angle θ, viewing in the axial direction, formed between a line segment L1 that connects an axial center O of the coil 10 and the outer end P1 and a line segment L2 that connects the axial center O and the sectional center P2 is 90 degrees or smaller, as illustrated in FIG. 6.

According to the above configuration, as illustrated in FIGS. 4 and 5, since the arm accommodating portion 66 and the terminal accommodating portion 90 both extending outward in the casing 8 are arranged in an aggregated manner, the abovementioned effects with the electromagnetic valve 2 equipped with the reed unit 6 can be obtained while suppressing upsizing of the electromagnetic valve 2.

Figure 11:
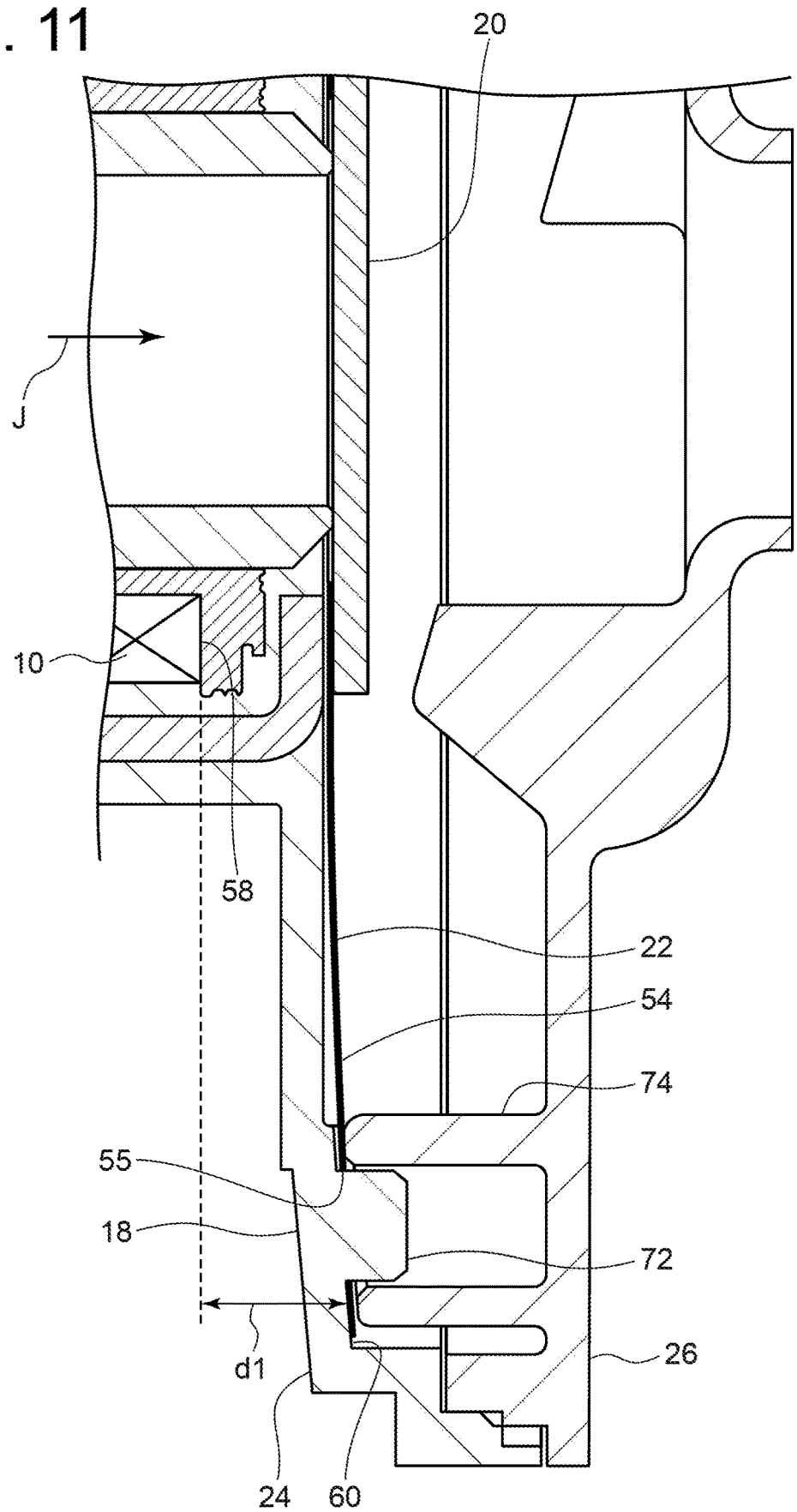
FIG. 11 is an enlarged sectional view of a plate spring fixing portion 18 of the electromagnetic valve 2 of FIG. 8.

FIG. 11 is an enlarged sectional view of the plate spring fixing portion 18 of the electromagnetic valve 2 of FIG. 8.

In some embodiments, for example as illustrated in FIG. 11, the plate spring fixing portion 18 includes a tilted face 60 that is tilted so that an axial distance d1 to an end face 58 of the coil 10 at the downstream side thereof increases toward the outside in the radial direction. The plate spring portion 22 of the reed unit 6 is fixed to the plate spring fixing portion 18 as being deformed along the tilted face 60. In the illustrated example, the plate spring fixing portion 18 includes a column-shaped convex portion 72 that is inserted through the through-hole 55 of the plate spring portion 22 as being protruded in the axial direction toward the cover 26 from the tilted face 60, and a cylinder-shaped convex portion 74 to which a leading end of the column-shaped convex portion 72 is inserted as being protruded in the axial direction toward the housing 24 from the cover 26. The arm portion 54 of the plate spring portion 22 is fixed as being sandwiched between the leading end of the cylinder-shaped convex portion 74 and the tilted face 60.

According to the above configuration, since the plate spring portion 22 of the reed unit 6 is fixed to the plate spring fixing portion 18 in a state of being deformed along the tilted face 60, the valve body portion 20 of the reed unit 6 can be urged toward the valve seat 16 with an elastic force of the plate spring portion 22 of the reed unit 6.

Figure 12:
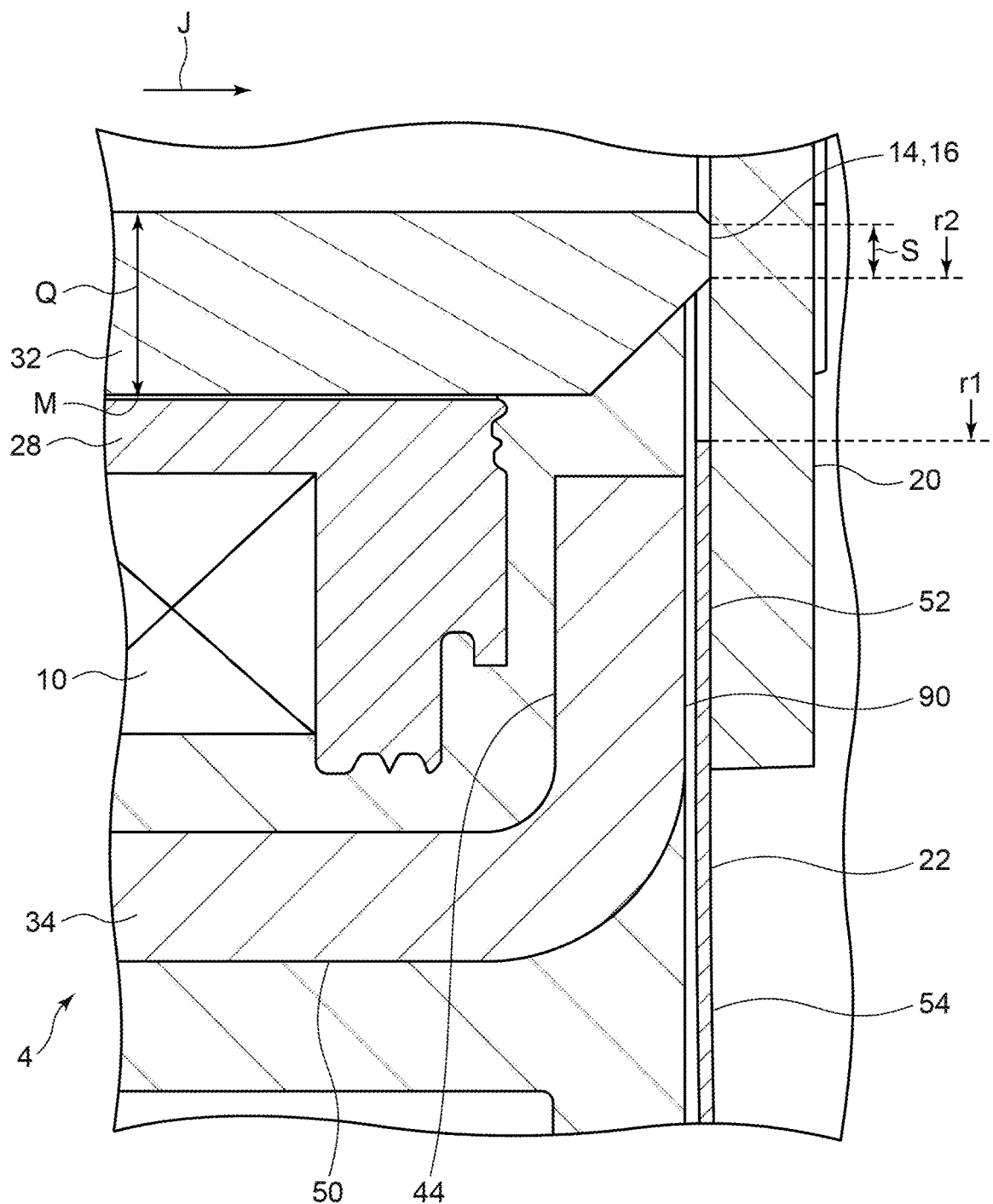
FIG. 12 is an enlarged sectional view in the vicinity of a contact region between a valve seat 16 and a valve body portion 20 of the electromagnetic valve 2 of FIG. 8.

FIG. 12 is an enlarged sectional view in the vicinity of a contact region between the valve seat 16 and the valve body portion 20 of the electromagnetic valve 2 of FIG. 8.

In some embodiments, for example as illustrated in FIG. 12, the ring-shaped portion 52 of the plate spring portion 22 holds the valve body portion 20 on the opposite side to the coil 10 and an inner diameter r1 of the ring-shaped portion 52 is larger than an outer diameter r2 of the valve seat 16.

According to the above configuration, since the ring-shaped portion 52 of the plate spring portion 22 holds the valve body portion 20 on the opposite side to the coil 10, a fixing portion (e.g., the clamping portions 56 illustrated in FIG. 5 and the like) for fixing the valve body portion 20 to the plate spring portion 22 can be arranged on the opposite side to the coil 10 with respect to the valve body portion 20. Accordingly, it is possible to avoid interference between the fixing portion and the solenoid unit 4 (e.g., interference between the outer yoke 34 and the clamping portions 56 illustrated in FIG. 5 and the like). Further, since the inner diameter r1 of the ring-shaped portion 52 is larger than the outer diameter r2 of the valve seat 16, the valve body portion 20 can be contacted to the valve seat 16 of the solenoid unit 4 at the inner circumferential side of the ring-shaped portion 52. In the illustrated example, since the inner yoke 32 extends downstream across the end face 90 of the outer yoke 34 at the downstream side thereof, the valve body portion 20 can be contacted, at the inner circumferential side of the ring-shaped portion 52, to the valve seat 16 formed at the inner yoke 32.

As illustrated in FIG. 12, when S denotes area of the valve seat 16 (hereinafter, called "seat area") and Q denotes sectional area of the inner yoke 32 at the center position M of the inner yoke 32 in the flow direction J, the inner yoke 32 is formed to satisfy "S<Q".

Figure 13:
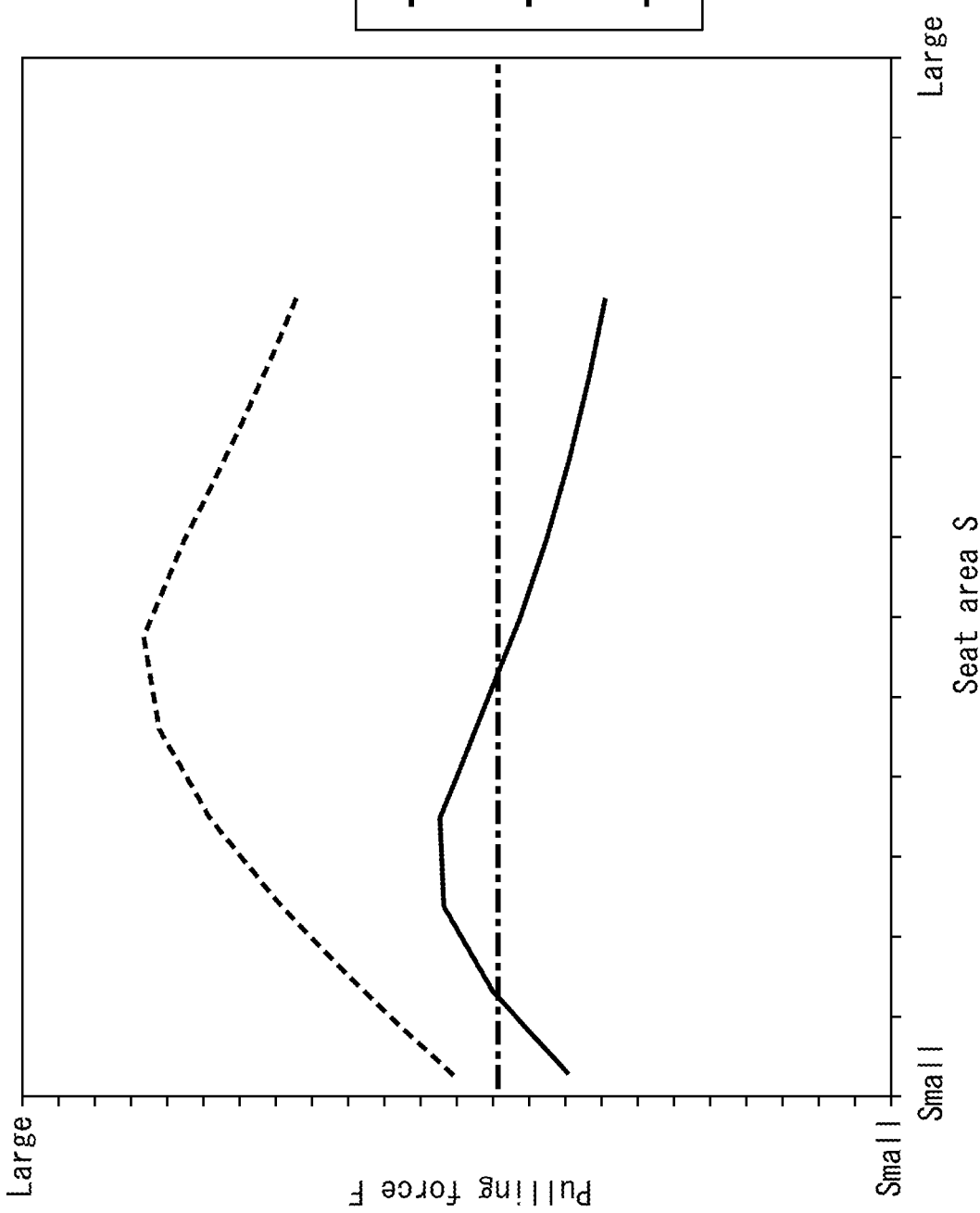
FIG. 13 is a graph indicating relations between seat area S and a pulling force F for pulling the reed unit 6 when current is applied to the coil 10 at both high temperature and normal temperature.
Figure 14:
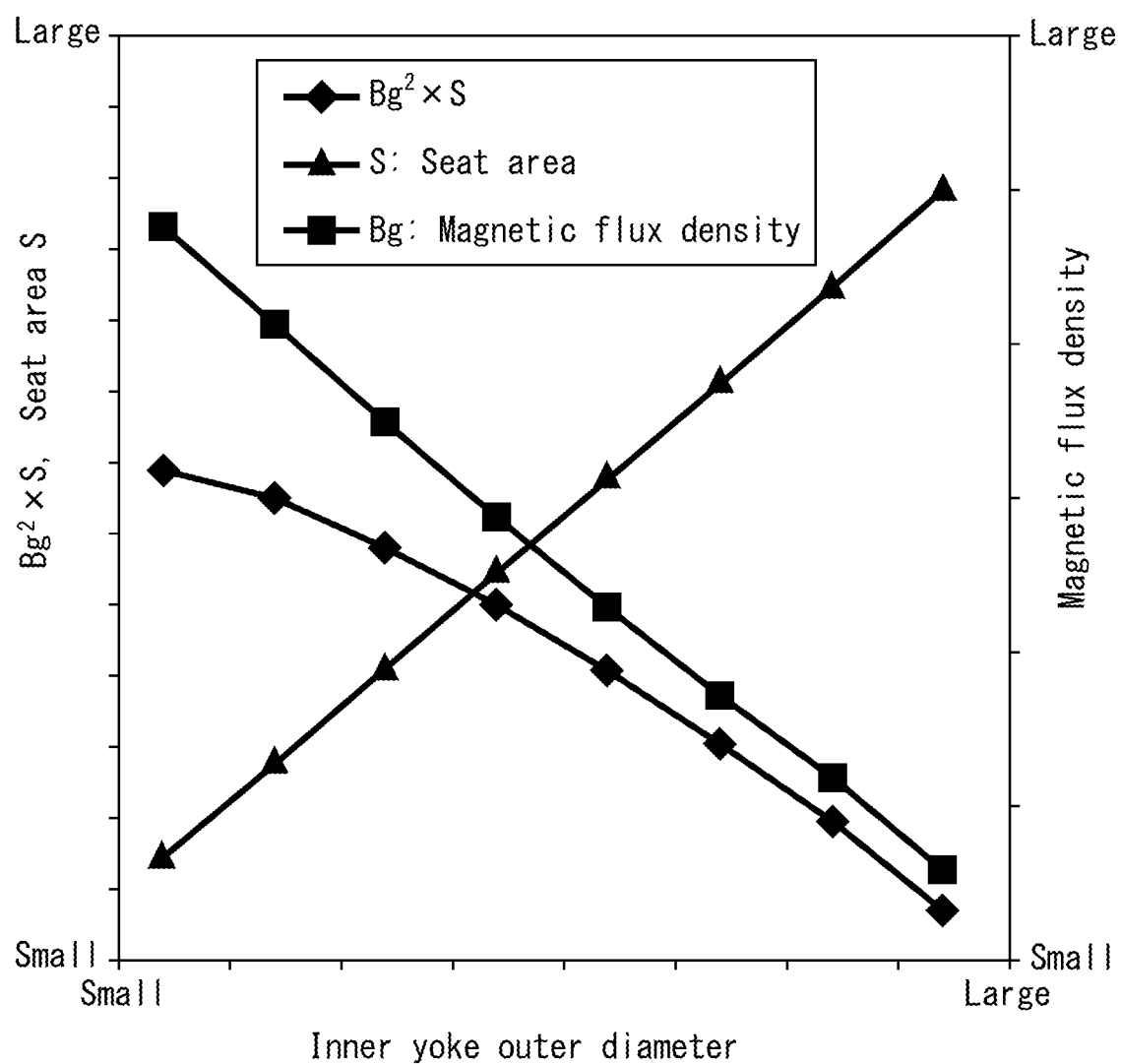
FIG. 14 is a graph indicating relations between an outer diameter of an inner yoke 32 and each of $Bg^2S$, S, and Bg.

Next, effects obtained with the above configuration are described with reference to FIGS. 13 and 14. FIG. 13 is a graph indicating relations between the seat area S and a pulling force F for pulling the reed unit 6 when current is applied to the coil 10 at both high temperature and normal temperature. FIG. 14 is a graph indicating relations between an outer diameter of an inner yoke 32 and each of $Bg^2S$, S, and Bg, while Bg denotes a magnetic flux density of the valve seat 16. Here, the pulling force F is expressed as "$F=(Bg^2S)/2\mu_0$", while $\mu_0$ denotes magnetic permeability in a vacuum.

As illustrated in FIG. 13, the seat area S with which the pulling force F at high temperature is the maximum is smaller than the seat area S with which the pulling force F at normal temperature is the maximum. Further, the pulling force F at high temperature is lower than that at normal temperature. When the electromagnetic valve 2 is used for controlling flow of coolant for an engine, the electromagnetic valve 2 is to be used basically under high temperature circumstances. Accordingly, in this case, it is preferable that the seat area S is set smaller than the seat area S with which the pulling force F is the maximum at normal temperature. It is more preferable to have the seat area S with which the pulling force F is in the vicinity of the maximum at high temperature. Accordingly, it is possible to stably obtain a large pulling force F. That is, a pulling force F larger than a required load can be easily obtained.

Here, the magnetic flux density Bg relies on the sectional area Q of the inner yoke 32. That is, the larger the sectional area Q is, the larger the magnetic flux density Bg is. Accordingly, owing to that the seat area S is set smaller than the sectional area Q of the inner yoke 32, a larger pulling force F can be obtained at high temperature without reducing the magnetic flux density Bg.

In the range illustrated in FIG. 14, the smaller the outer diameter of the inner yoke 32 is, the smaller the seat area S is and the larger the square of the magnetic flux density Bg is. Here, when the outer diameter of the inner yoke 32 is set smaller, since influence caused by the increased amount of the square of the magnetic flux density Bg is larger than that caused by the decreased amount of the seat area S, the pulling force is increased as well. Accordingly, as illustrated in FIG. 13, the pulling force F increases with decrease of the seat area S in some region.

Figure 15:
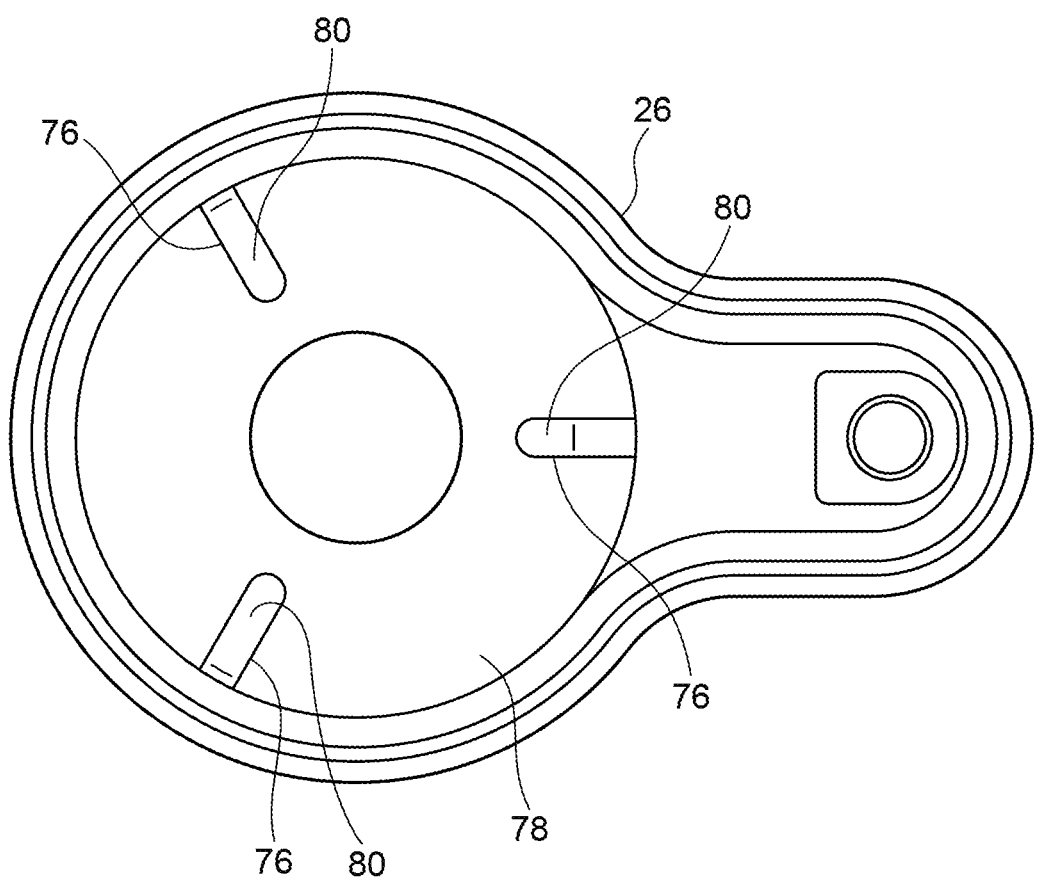
FIG. 15 is a view illustrating a cover 26 viewing in an axial direction of the coil 10.
Figure 16:
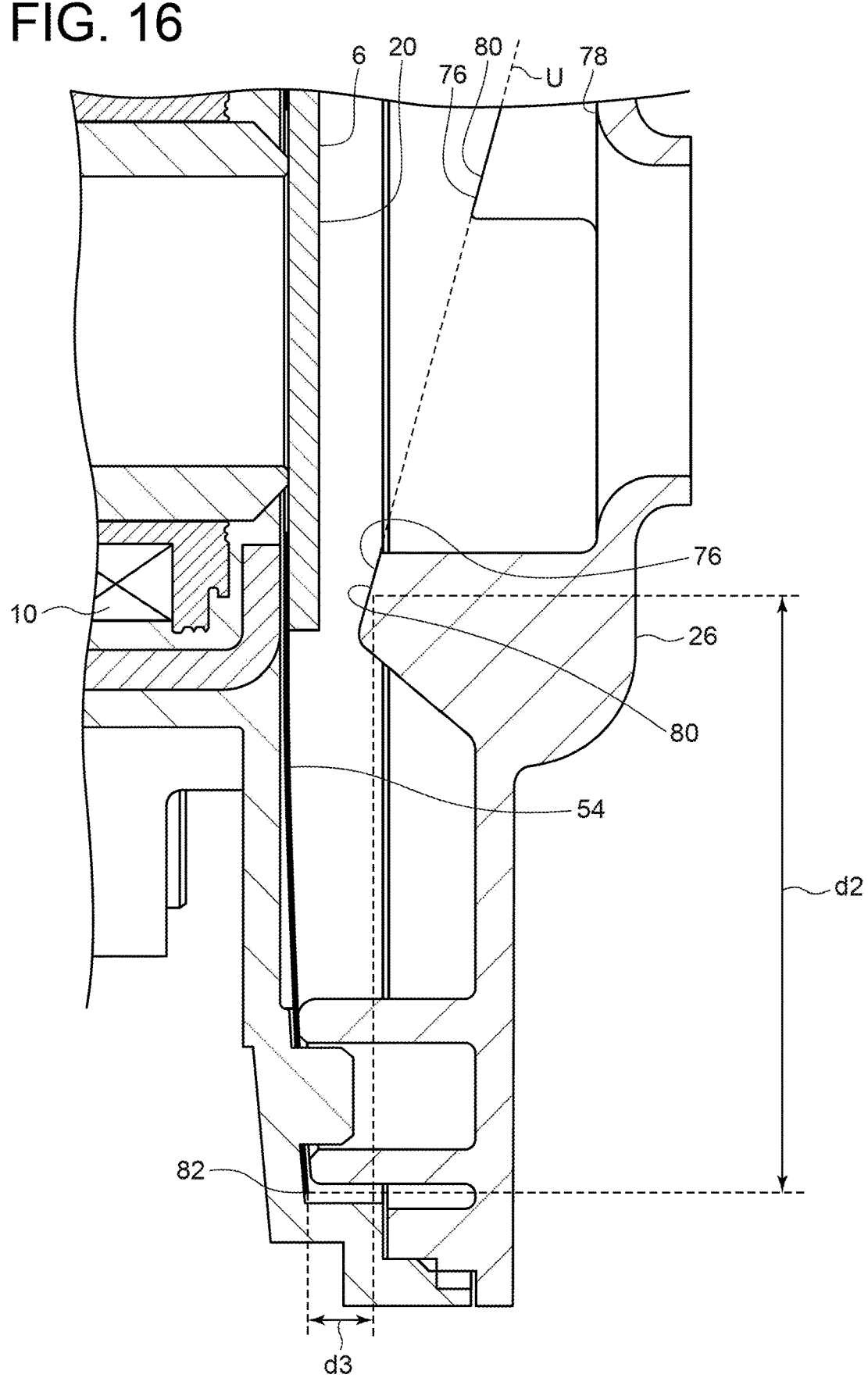
FIG. 16 is an enlarged sectional view of the plate spring fixing portion 18.

FIG. 15 is a view illustrating the cover 26 viewing in the axial direction. FIG. 16 is an enlarged sectional view of the plate spring fixing portion 18.

As illustrated in at least one of FIGS. 15 and 16, the cover 26 includes at least one regulating portion 76 that regulates a deformation amount of the valve body portion 20 at a position opposite to the coil 10 with respect to the valve body portion 20. In the illustrated example, the cover 26 includes a plurality of regulating portions 76 arranged at intervals in the circumferential direction of the coil 10. Each of the regulating portions 76 is protruded toward the valve body portion 20 from a face 78 of the cover 26 facing toward the valve body portion 20 (i.e., inner face of the cover 26). As illustrated in FIG. 16, a top face 80 of each regulating portion 76 is tilted so that an axial distance d3 to a base end 82 of the plate spring portion 22 (i.e., a base end of the arm portion 54) increases with increase of a radial distance to the base end 82. The top faces 80 of the respective regulating portions 76 are arranged on the same plane U.

According to the above configuration, since the regulating portion 76 that regulates a deformation amount of the reed unit 6 is arranged on the opposite side to the coil 10 with respect to the reed unit 6, a flow rate of the electromagnetic valve 2 in the open state can be appropriately controlled.

Further, since each top face 80 is tilted so that the axial distance d3 to the base end 82 of the reed unit 6 increases with increase of the radial distance d2 to the base end 82 and the respective top faces 80 are arranged on the same plane U, the valve body portion 20 in the open state can be stably supported by the top faces 80 arranged on the same plane U. Accordingly, a flow rate of the electromagnetic valve 2 in the open state can be appropriately controlled.

Not limited to the abovementioned embodiments, the present invention includes modifications of the embodiments and appropriate combinations of the embodiments.

For example, in some embodiments described above, the exemplified reed unit includes the valve body portion and the plate spring portion made of materials different from each other. However, in other embodiments, a valve body portion and a plate spring portion may be integrally made of the same material.

Further, in some embodiments described above, the ring-shaped portion of the plate spring portion is configured to hold the valve body portion on the opposite side to the coil. However, in other embodiments, a plate spring may hold a valve body portion on the side of a coil.

The invention claimed is:

1. An electromagnetic valve comprising:
    a solenoid unit including a cylinder-shaped coil with a flow path formed at an inner circumferential side of the coil;
    a valve body portion having a first portion and a second portion different from the first portion;
    a plate spring portion configured to generate an urging force, due to elastic deformation of the plate spring portion, that urges the valve body portion toward a valve seat formed on an end face on a downstream side in a flow direction of the flow path out of end faces of the solenoid unit such that (i) in a case where the valve body portion is in a closed position, the first portion of the valve body portion contacts a third portion of the valve seat, and the second portion of the valve body portion contacts a fourth portion of the valve seat different from the third portion of the valve seat, and (ii) in a case where the valve body portion is in an open position, a first distance from the first portion of the valve body portion to the third portion of the valve seat is less than a second distance from the second portion of the valve body portion to the fourth portion of the valve seat; and
    a casing accommodating the solenoid unit, the valve body portion, and the plate spring portion.

2. The electromagnetic valve according to claim 1,
    wherein the casing includes a plate spring fixing portion fixing the plate spring portion, and
    the plate spring fixing portion is arranged outside the coil in a radial direction of the coil.

3. The electromagnetic valve according to claim 1, wherein the valve body portion and the plate spring portion are made of materials different from each other.

4. The electromagnetic valve according to claim 3, wherein a magnetic permeability of the valve body portion is larger than a magnetic permeability of the plate spring portion.

5. The electromagnetic valve according to claim 3, wherein a thickness of the valve body portion is larger than a thickness of the plate spring portion.

6. The electromagnetic valve according to claim 3,
    wherein the plate spring portion includes a ring-shaped portion,
    an inner diameter of the ring-shaped portion is larger than an outer diameter of the valve seat,
    the ring-shaped portion holds the valve body portion on an opposite side to the coil, and
    the valve seat is arranged capable of contacting to the valve body portion at the inner circumferential side of the ring-shaped portion.

7. The electromagnetic valve according to claim 1,
    wherein the flow path is a flow path through which coolant for an engine flows,
    the solenoid unit includes a cylinder-shaped inner yoke arranged at the inner circumferential side of the coil,
    the valve seat is formed on an end face of the inner yoke at the downstream side of the flow direction, and
    the inner yoke is formed as satisfying S<Q, where S denotes an area of the valve seat and Q denotes a sectional area of the inner yoke at a center position of the coil in the flow direction.

8. The electromagnetic valve according to claim 1, wherein the casing includes a plate spring fixing portion fixing a first end portion of the plate spring portion, and among the third portion of the valve seat and the fourth portion of the valve seat, the third portion of the valve seat is closer to the first end portion of the plate spring portion.

9. The electromagnetic valve according to claim 8, wherein the valve body portion is arranged at a second end portion of the plate spring portion opposite the first end portion of the plate spring portion.

10. An electromagnetic valve comprising:
    a solenoid unit including a cylinder-shaped coil with a flow path formed at an inner circumferential side of the coil;

a valve body portion;
a plate spring portion urging the valve body portion toward a valve seat formed on an end face on a downstream side in a flow direction of the flow path out of end faces of the solenoid unit; and
a casing accommodating the solenoid unit, the valve body portion, and the plate spring portion,
wherein the casing includes a plate spring fixing portion fixing the plate spring portion, and the plate spring fixing portion is arranged outside the coil in a radial direction of the coil,
wherein the plate spring fixing portion includes a tilted face tilted so that a distance in an axial direction of the coil to the valve seat of the solenoid unit increases toward the outside in the radial direction of the coil, and
the plate spring portion is fixed to the plate spring fixing portion as being deformed along the tilted face.

11. An electromagnetic valve comprising:
a solenoid unit including a cylinder-shaped coil with a flow path formed at an inner circumferential side of the coil;
a valve body portion;
a plate spring portion urging the valve body portion toward a valve seat formed on an end face on a downstream side in a flow direction of the flow path out of end faces of the solenoid unit; and
a casing accommodating the solenoid unit, the valve body portion, and the plate spring portion,
wherein the casing includes at least one regulating portion regulating a deformation amount of the valve body portion at a position opposite to the coil with respect to the valve body portion.

12. The electromagnetic valve according to claim 11,
wherein the at least one regulating portion includes a plurality of regulating portions arranged at intervals in the circumferential direction of the coil,
each of the plurality of regulating portions is protruded toward the valve body portion,
a top face of each of the plurality of regulating portions is tilted so that a distance $d3$ in the axial direction of the coil to a base end of the plate spring portion increases with increase of a distance $d2$ in the radial direction of the coil to the base end, and
the top faces of the respective regulating portions are arranged on the same plane.

13. An electromagnetic valve comprising:
a solenoid unit including a cylinder-shaped coil with a flow path formed at an inner circumferential side of the coil;
a valve body portion;
a plate spring portion urging the valve body portion toward a valve seat formed on an end face on a downstream side in a flow direction of the flow path out of end faces of the solenoid unit; and
a casing accommodating the solenoid unit, the valve body portion, and the plate spring portion,
wherein the plate spring portion includes a ring-shaped portion and an arm portion extending from the ring-shaped portion,
the casing includes an arm accommodating portion accommodating the arm portion, and a cylinder-shaped terminal accommodating portion accommodating a terminal of the coil, and
an angle $\theta$, viewing in the axial direction of the coil, formed between a line segment $L1$ that connects an axial center $O$ of the coil and an outer end $P1$ and a line segment $L2$ that connects the axial center $O$ and a sectional center $P2$ is 90 degrees or smaller, where $P1$ denotes the outer end of the arm accommodating portion in the radial direction of the coil and $P2$ denotes the sectional center of the terminal accommodating portion at a leading end of the terminal accommodating portion.

* * * * *